United States Patent
Tseng

(10) Patent No.: US 9,331,833 B2
(45) Date of Patent: May 3, 2016

(54) METHOD AND APPARATUS FOR CARRIER MANAGEMENT

(75) Inventor: Li-Chih Tseng, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 892 days.

(21) Appl. No.: 12/730,157

(22) Filed: Mar. 23, 2010

(65) Prior Publication Data

US 2010/0240406 A1 Sep. 23, 2010

Related U.S. Application Data

(60) Provisional application No. 61/162,340, filed on Mar. 23, 2009.

(51) Int. Cl.
*H04W 72/02* (2009.01)
*H04L 5/00* (2006.01)
*H04W 72/04* (2009.01)

(52) U.S. Cl.
CPC ............. *H04L 5/0062* (2013.01); *H04L 5/0007* (2013.01); *H04L 5/0044* (2013.01); *H04W 72/02* (2013.01); *H04W 72/042* (2013.01)

(58) Field of Classification Search
CPC ... H04L 5/0007; H04L 5/0044; H04L 5/0062; H04W 72/02; H04W 72/04; H04W 72/0406; H04W 72/042; H04W 72/044; H04W 72/0453; H04W 72/08; H04W 72/085; H04W 72/087
See application file for complete search history.

(56) References Cited

U.S. PATENT DOCUMENTS 8,243,665 B2 * 8/2012 Lee et al. .............. 455/450
2011/0126068 A1 * 5/2011 Lee et al. .............. 714/748

FOREIGN PATENT DOCUMENTS

| CN | 101189903 A | 5/2008 |
| WO | 2008024631 A2 | 2/2008 |
| WO | 2009120123 A1 | 10/2009 |

OTHER PUBLICATIONS

Ericsson:"Carrier aggregation in LTE-Advanced",TSG-RAN WG1 #53bis, R1-082468, Jun. 30-Jul. 4, 2008, XP050110739, Warsaw, Poland.
Motorola: "Control Signalling Design for Supporting Carrier Aggregation", 3GPP TSG RAN1#56, R1-090792, Feb. 9-13, 2009, XP050318649, Athens, Greece.
Panasonic:"LTE-advanced discussion for RAN2", 3GPP TSG RAN WG2 #65 bis, R2-092394, Mar. 23-27, 2009, XP050340115, Seoul, Korea.
3rd Generation Partnership Project; Technical Specification Group Radio Access Network; Further Advancements for E-UTRA Physical Layer Aspects (Release 9), 3GPP TR 36.814 V0.4.1(Feb. 2009), front page+ pp. 2-31, XP050380817, Sophia-Antipolis, France.
3GPP TS 36.300 V8.6.0 (Sep. 2008).
(Continued)

*Primary Examiner* — Philip Sobutka
(74) *Attorney, Agent, or Firm* — Blue Capital Law Firm, P.C.

(57) ABSTRACT

A method for a user equipment (UE) of a wireless communication system performing carrier management is disclosed. The wireless communication system supports Carrier Aggregation (CA), which enables the UE to perform transmission through multiple carriers. The method includes steps of configuring a plurality of carriers, and activating or deactivating a carrier group of the plurality of carriers according to Medium Access Control (MAC) signaling.

12 Claims, 4 Drawing Sheets

(56) References Cited

OTHER PUBLICATIONS

Office Action on corresponding foreign application (EP 10003063.4) from EPO dated Dec. 12, 2011.
3GPP TS 36.321 V8.4.0 3rd Generation Partnership Project: Technical Specification Group Radio Access Network: Evolved Universal Terrestrial Radio Access (E-UTRA) Medium Access Control (MAC) protocol specification (Release 8), Dec. 2008.
3GPP TSG RAN2 Meeting #65 R2-091630 "Counter proposal to R2-090969 on Management for HARQ buffer with TAT", Feb. 2009.
3GPP TSG-RAN2 meeting#65bis R2-092146 "PUSCH and PRACH collision", Mar. 2009.
LTE-Advanced-Evolving LTE towards IMT-Advanced, Mar. 2008.
Broadband Radio Access-LTE and LTE-Advanced, Dec. 2009.

* cited by examiner

METHOD AND APPARATUS FOR CARRIER MANAGEMENT

CROSS REFERENCE TO RELATED APPLICATIONS

This application claims the benefit of U.S. Provisional Application No. 61/162,340, filed on Mar. 23, 2009 and entitled "Interaction between Random Access procedure and TTI bundling operation", the contents of which are incorporated herein by reference.

BACKGROUND OF THE INVENTION

1. Field of the Invention

The present invention relates to a method and apparatus for carrier management, and more particularly, to a method and apparatus for performing carrier management in a user equipment (UE) of a wireless communication system to support carrier aggregation.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in base stations (Node Bs) alone rather than in Node Bs and RNC (Radio Network Controller) respectively, so that the system structure becomes simple.

However, the 3rd Generation Partnership Project (3GPP) has started to work out a next generation of the LTE system: the LTE Advanced (LTE-A) system, to meet future requirements of all kinds of communication services. Carrier Aggregation (CA) is introduced in the LTE-A system, which enables the UE to aggregate multiple carries for transmission, such that the transmission bandwidth and spectrum efficiency can be enhanced.

At present, the characteristics of carrier aggregation are quoted as below:

(1) Supporting carrier aggregation for both contiguous and non-contiguous component carriers.

(2) The aggregated number of component carriers in the uplink (UL) and the downlink (DL) can be different. For backward-compatible configuration, the aggregated numbers of component carriers in the UL and the DL should be the same.

(3) It is possible to configure a UE to aggregate a different number of component carriers in the UL and the DL to obtain different bandwidths.

(4) From a UE perspective, there is one transport block and one hybrid-ARQ (HARQ) entity per scheduled component carrier. Each transport block is mapped to a single component carrier only.

Besides, carrier configuration for Carrier Aggregation can be done through Radio Resource Control (RRC) Reconfiguration. For example, the network may send an RRC Connection Setup message or a RRC Reconfiguration message to configure component carriers of the UE.

Generally, after having Carrier Aggregation, the UE may have to monitor several carriers configured by upper layers (e.g. RRC layer) simultaneously, to obtain related control and scheduling information of the configured carriers, such that data reception can be each performed on the configured carriers. However, in some conditions (e.g. low data rate, or in UE idle state), some carriers are not used. Keeping monitoring all the configured carriers would cause unnecessary power consumption of the UE. Thus, some of the configured carriers have to be turned off or deactivated correspondingly. As mentioned above, the carrier configuration is done though higher layer signaling, and thus cannot respond quickly to the changed condition of the UE.

SUMMARY OF THE INVENTION

It is therefore an objective of the present invention to provide a method and apparatus for performing carrier management in a user equipment (UE) of a wireless communications system.

According to the present invention, a method for performing carrier management in a user equipment (UE) of a wireless communication system is disclosed. The wireless communication system supports Carrier Aggregation (CA), such that the UE is able to perform transmission through multiple carriers. The method includes steps of configuring a plurality of uplink carriers; and activating or deactivating a carrier group of the plurality of carriers according to Medium Access Control (MAC) signaling.

According to the present invention, a communications device for performing carrier management in a user equipment (UE) of a wireless communication system is disclosed. The wireless communication system supports Carrier Aggregation (CA), such that the UE is able to perform transmission through multiple carriers. The communications device includes a processor for executing a program code, and a memory, coupled to the processor, for storing the program code. The program code includes steps of configuring a plurality of uplink carriers; and activating or deactivating a carrier group of the plurality of carriers according to Medium Access Control (MAC) signaling.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
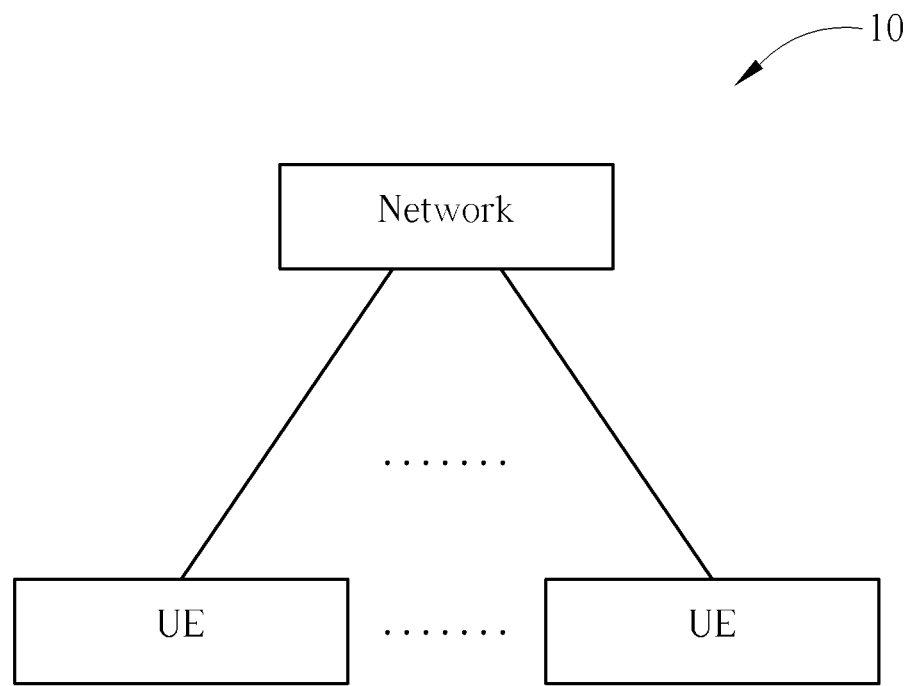
FIG. 1 is a schematic diagram of a wireless communications system.

Please refer to FIG. 1, which illustrates a schematic diagram of a wireless communications system 10. The wireless communications system 10 is preferred to be an LTE advanced (LTE-A) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
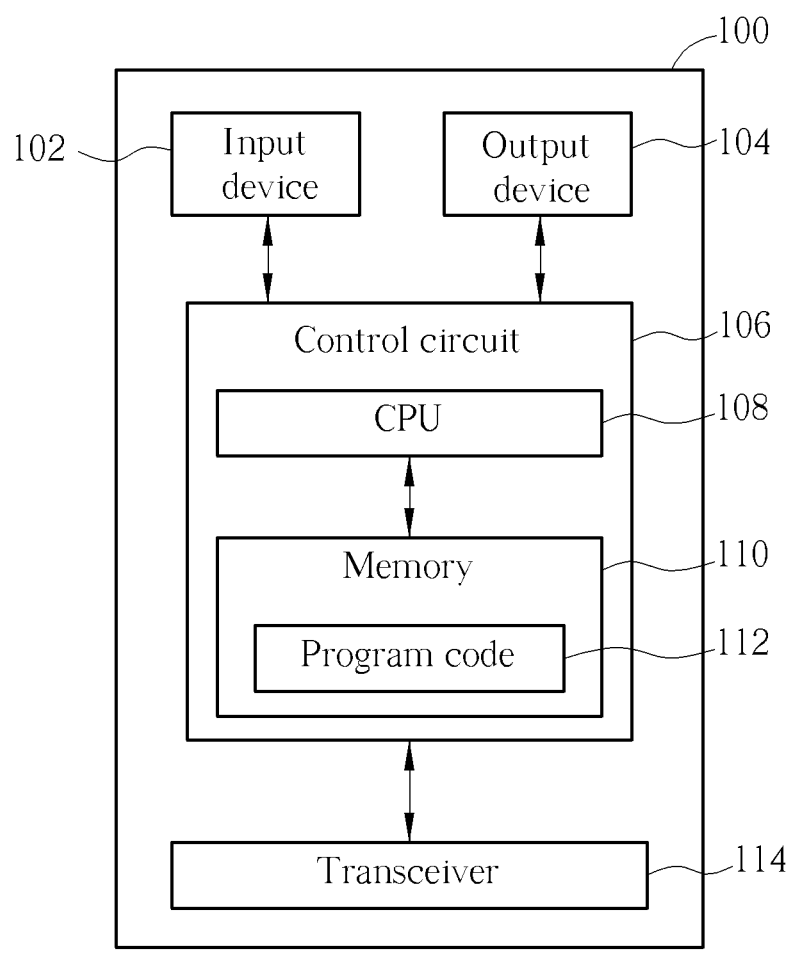
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
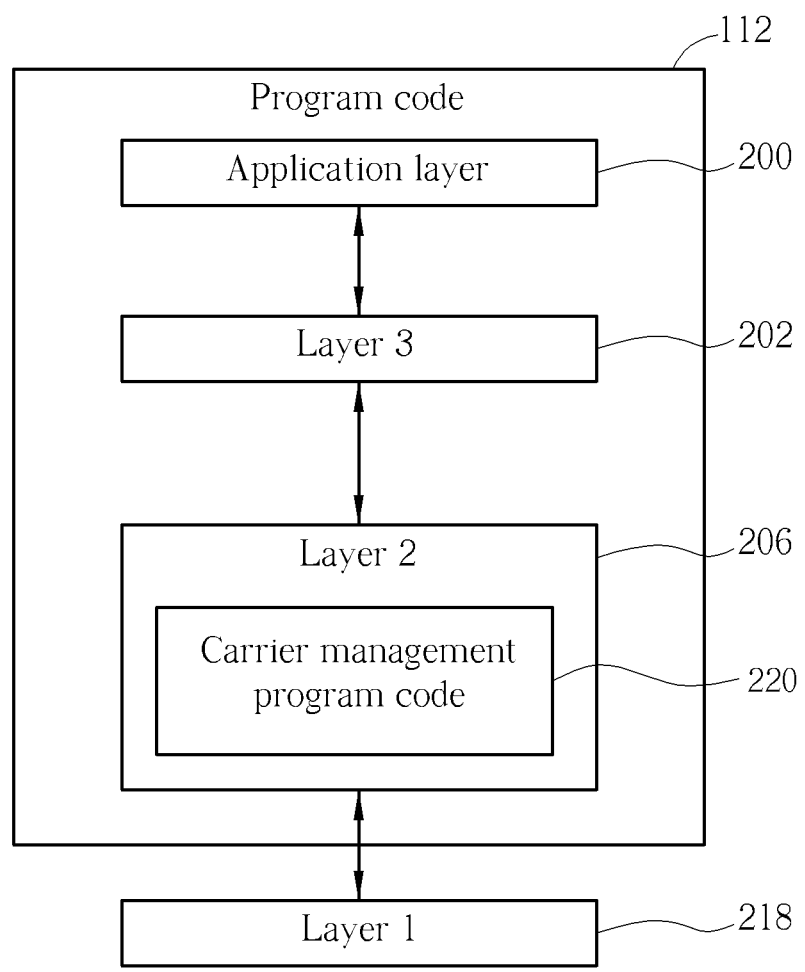
FIG. 3 is a diagram of a program code of FIG. 2.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

In LTE-A system, the Layer 2 206 may supports a Carrier Aggregation (CA) technology, which enables the UE to perform transmission through multiple carriers. In such a situation, the embodiment of the present invention provides a carrier management program code 220 for activating or deactivating carriers configured by upper layers quickly, so as to enhance the system performance.

Figure 4:
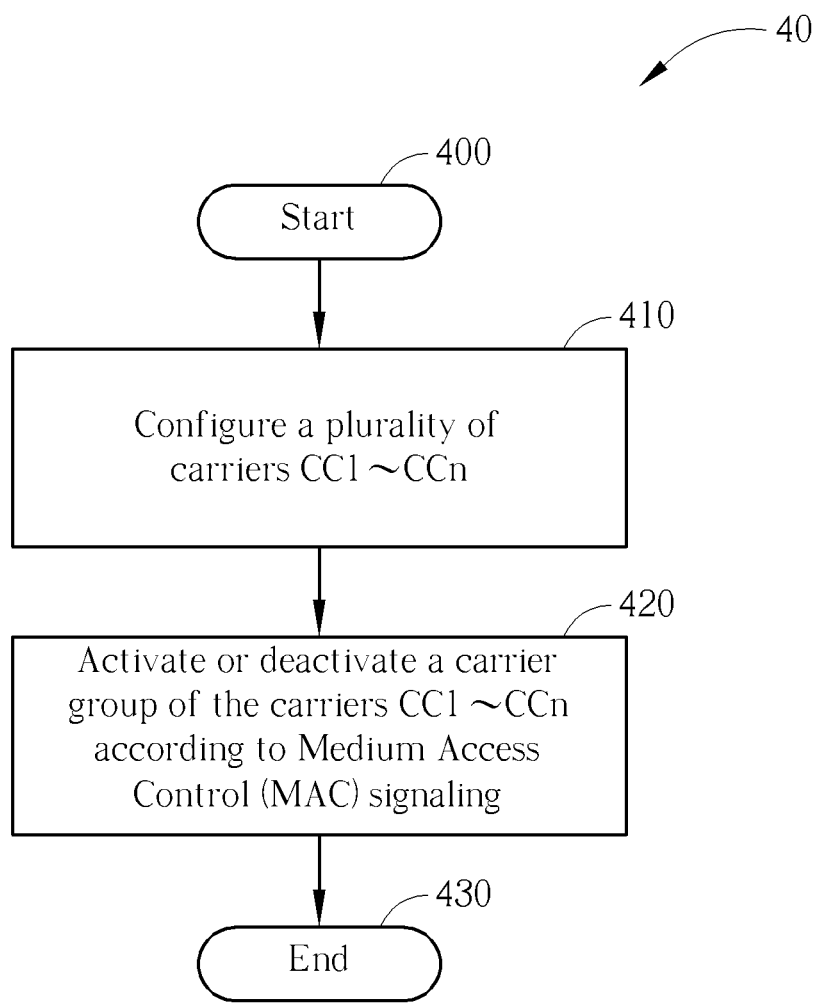
FIG. 4 is a flowchart of a process according to an embodiment of the present invention.

Please refer to FIG. 4, which illustrates a schematic diagram of a process 40. The process 40 is utilized for performing carrier management in a UE of the wireless communications system 10, and can be compiled into the carrier management program code 220. The process 40 includes the following steps:

Step 400: Start.

Step 410: Configure a plurality of carriers CC1~CCn.

Step 420: Activate or deactivate a carrier group of the carriers CC1~CCn according to Medium Access Control (MAC) signaling.

Step 430: End.

According to the process 40, when carrier aggregation is applied, the UE first configure carriers CC1~CCn through upper layer signaling, such as RRC signaling like an RRC Connection Setup message or an RRC Reconfiguration, for example. Then, the UE may activate or deactivate a carrier group of the carriers CC1~CCn according to MAC signaling. That is to say, in the embodiment of the present invention, the operation state of the upper-layer configured carriers is switched through the MAC signaling, to quickly respond to data rate change of the UE, such that the system performance can be enhanced.

For example, if the UE enters into an idle mode, the network can deactivate some of the configured carriers of the UE through the MAC signaling, such that the UE is able to stop monitoring all of the configured carriers and save power consumption. Conversely, the network can also activate some of the deactivated carriers through the MAC signaling, so as to increase bandwidth and transmission efficiency. As a result, the number of aggregated carriers can be switched quickly to respond to the changed condition of the UE.

In the LTE system, a MAC Protocol Data Unit (PDU) consists of a MAC header, zero or more MAC Service Data Units (SDUs), zero or more MAC control elements, and optionally padding. Thus, in the embodiment of the present invention, the above MAC signaling can be carried in one Control Element of the MAC PDU, so the UE is able to activate or deactivate a carrier group of the upper-layer configured carriers according to the received MAC Control Element.

Of course, the said carrier group may include multiple carriers or only one specific carrier, depending on practical requirements. In other embodiments, the same Control Element can also carry multiple MAC signaling for individually switching the operation state of multiple carrier groups. Such variation also belongs to the scope of the present invention.

Please note that the process 40 can be applied either to uplink carriers or downlink carriers. Those skilled in the art can certainly made appropriate modifications according to practical demands, which all belong to the scope of the present invention, as long as the operation state of configured carriers is switched though the MAC signaling.

In summary, when carrier aggregation is applied, the present invention switches the operation state of upper-layer configured carriers through the MAC signaling. As a result, the number of aggregated carriers can be varied quickly to respond to the changed condition of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing carrier management in a user equipment (UE) of a wireless communication system, the wireless communication system supporting Carrier Aggregation (CA) such that the UE is able to perform transmission through multiple carriers, the method comprising:

configuring a plurality of carriers through an RRC (Radio Resource Control) signaling, including a RRC Connection Setup message or a RRC Reconfiguration message; and activating a first carrier group from idle to active state, or deactivating a second carrier group from active to idle state through Medium Access Control (MAC) signaling, which is carried by a MAC Control Element, to switch operating states of the plurality of carriers to quickly respond to data rate change of the UE so that system performance could be enhanced, wherein the first carrier group includes some of the plurality of carriers that was configured through the RRC signaling, and the second carrier group includes some of the plurality of carriers that was configured through the RRC signaling and that was not included in the first carrier group.

2. The method of claim 1, wherein the plurality of carriers are downlink carriers.

3. The method of claim 1, wherein the plurality of carriers are uplink carriers.

4. The method of claim 1, wherein the first carrier group or the second carrier group only consists of one specific carrier.

5. The method of claim 1, wherein the plurality of carriers is configured by upper layer signaling.

6. The method of claim 1, wherein the wireless communication system is a Long Term Evolution Advanced (LTE-A) system.

7. A communication device for performing carrier management in a user equipment (UE) of a wireless communication system, the wireless communication system supporting Carrier Aggregation (CA) such that the UE is able to perform transmission through multiple carriers, the communication device comprising:
a processor for executing a program code; and
a memory coupled to the processor for storing the program code; wherein the program code comprises:
configuring a plurality of carriers through an RRC (Radio Resource Control) signaling, including a RRC Connection Setup message or a RRC Reconfiguration message; and
activating a first carrier group from idle to active state, or deactivating a second carrier group from active to idle state through Medium Access Control (MAC) signaling, which is carried by a MAC Control Element, to switch operating states of the plurality of carriers to quickly respond to data rate change of the UE so that system performance could be enhanced,
wherein the first carrier group includes some of the plurality of carriers that was configured through the RRC signaling, and the second carrier group includes some of the plurality of carriers that was configured through the RRC signaling and that was not included in the first carrier group.

8. The communication device of claim 7, wherein the plurality of carriers are downlink carriers.

9. The communication device of claim 7, wherein the plurality of carriers are uplink carriers.

10. The communication device of claim 7, wherein the first carrier group or the second carrier group only consists of one specific carrier.

11. The communication device of claim 7, wherein the plurality of carriers is configured by upper layer signaling.

12. The communication device of claim 7, wherein the wireless communication system is a Long Term Evolution Advanced (LTE-A) system.

* * * * *